US011267418B2

(12) United States Patent
Kataoka et al.

(10) Patent No.: US 11,267,418 B2
(45) Date of Patent: Mar. 8, 2022

(54) SENSOR MOUNTING STRUCTURE FOR VEHICLE

(71) Applicant: TOYOTA JIDOSHA KABUSHIKI KAISHA, Toyota (JP)

(72) Inventors: Yusuke Kataoka, Toyota (JP); Ryo Iwamatsu, Toyota (JP); Kensaku Shibata, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 221 days.

(21) Appl. No.: 16/658,763

(22) Filed: Oct. 21, 2019

(65) Prior Publication Data
US 2020/0156576 A1    May 21, 2020

(30) Foreign Application Priority Data

Nov. 20, 2018 (JP) .............................. JP2018-217713

(51) Int. Cl.
*B60R 19/48* (2006.01)
*G01S 13/931* (2020.01)
*G01S 15/931* (2020.01)
*B60R 19/24* (2006.01)

(52) U.S. Cl.
CPC ...... *B60R 19/483* (2013.01); *B60R 2019/247* (2013.01); *G01S 13/931* (2013.01); *G01S 15/931* (2013.01); *G01S 2013/93275* (2020.01); *G01S 2015/938* (2013.01)

(58) Field of Classification Search
CPC ......... B60R 19/483; G01S 2013/93274; G01S 13/931; G01S 15/931; G01S 2015/937; G01S 17/931
See application file for complete search history.

(56) References Cited

U.S. PATENT DOCUMENTS

| 9,673,517 | B2* | 6/2017 | Tran | H01Q 1/3233 |
| 10,073,178 | B2* | 9/2018 | Hara | G01S 7/4813 |
| 10,144,424 | B2* | 12/2018 | Hara | B60W 30/16 |
| 11,046,255 | B2* | 6/2021 | Miwa | G01S 13/931 |
| 2003/0184471 | A1* | 10/2003 | Tohyama | H01Q 1/125 342/175 |
| 2014/0070982 | A1* | 3/2014 | Inada | B60R 19/483 342/188 |
| 2014/0111950 | A1* | 4/2014 | Yamasaki | B60R 16/0239 361/747 |

(Continued)

FOREIGN PATENT DOCUMENTS

| JP | 2017-193223 A | 10/2017 |
| JP | 2018-134936 A | 8/2018 |

*Primary Examiner* — Gregory A Blankenship
(74) *Attorney, Agent, or Firm* — Sughrue Mion, PLLC

(57) ABSTRACT

A sensor mounting structure for a vehicle includes: a fender panel; a cowl side panel provided at a lateral side of a cowl and disposed at an inner side, in a vehicle transverse direction, of the fender panel; a peripheral information detection sensor disposed at an inner side of the rear portion of the fender panel and at an outer side of the cowl side panel, the peripheral information detection sensor having a detection portion facing toward an outer side; and a mounting bracket having a vertical wall to which the peripheral information detection sensor is fixed, the mounting bracket being fixed to a vehicle body side member and being disposed between the peripheral information detection sensor and the cowl side panel.

3 Claims, 5 Drawing Sheets

(56) References Cited

U.S. PATENT DOCUMENTS

| | | |
|---|---|---|
| 2016/0291151 A1* | 10/2016 | Dechoux ............... G01S 13/931 |
| 2017/0297521 A1 | 10/2017 | Sugie et al. |
| 2018/0236958 A1 | 8/2018 | Horiuchi et al. |
| 2019/0256009 A1* | 8/2019 | Miwa .................... B60R 19/483 |
| 2019/0366963 A1* | 12/2019 | Kumashiro ............ H05K 9/002 |
| 2020/0156576 A1* | 5/2020 | Kataoka ................ B60R 19/483 |
| 2020/0158828 A1* | 5/2020 | Kataoka ................ B60R 19/483 |
| 2021/0001794 A1* | 1/2021 | Umeki .................... B60R 11/00 |
| 2021/0031701 A1* | 2/2021 | Kitagawa ................ B60R 11/02 |
| 2021/0148737 A1* | 5/2021 | Yamaji ................. G01S 13/931 |

* cited by examiner

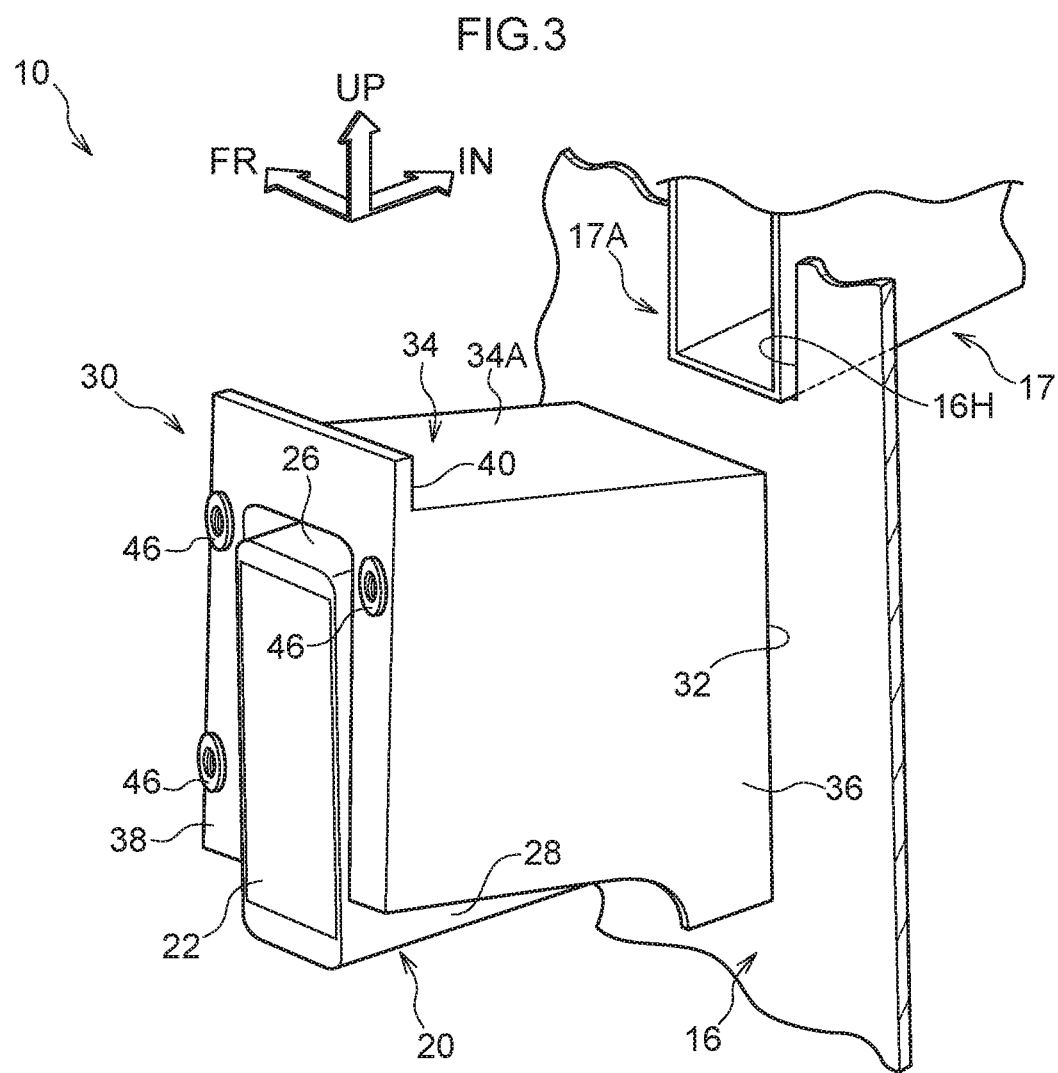

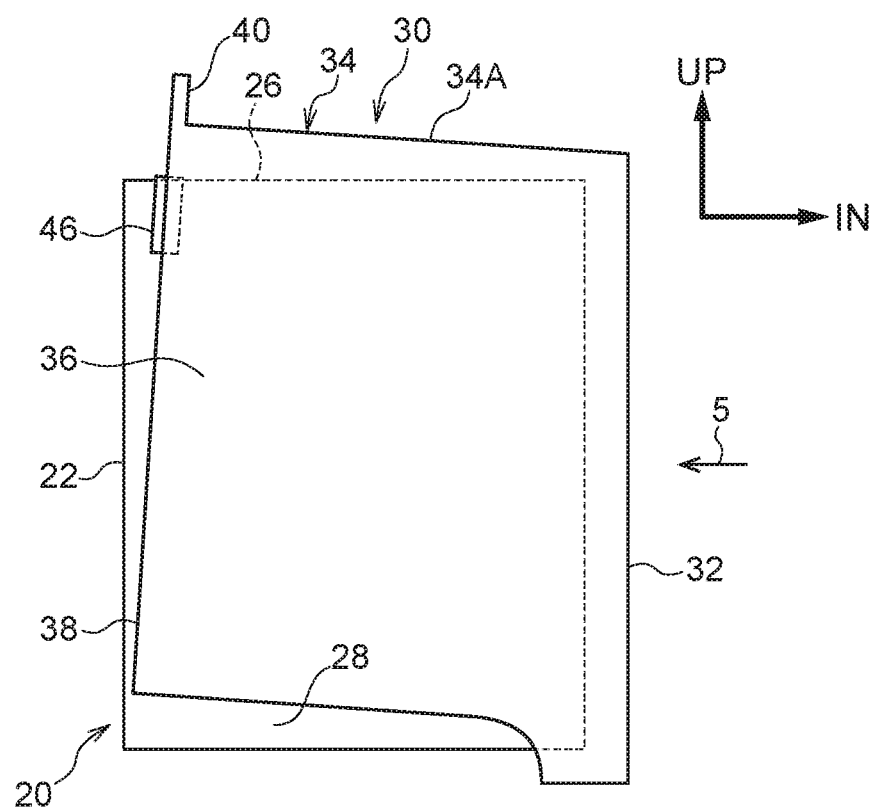

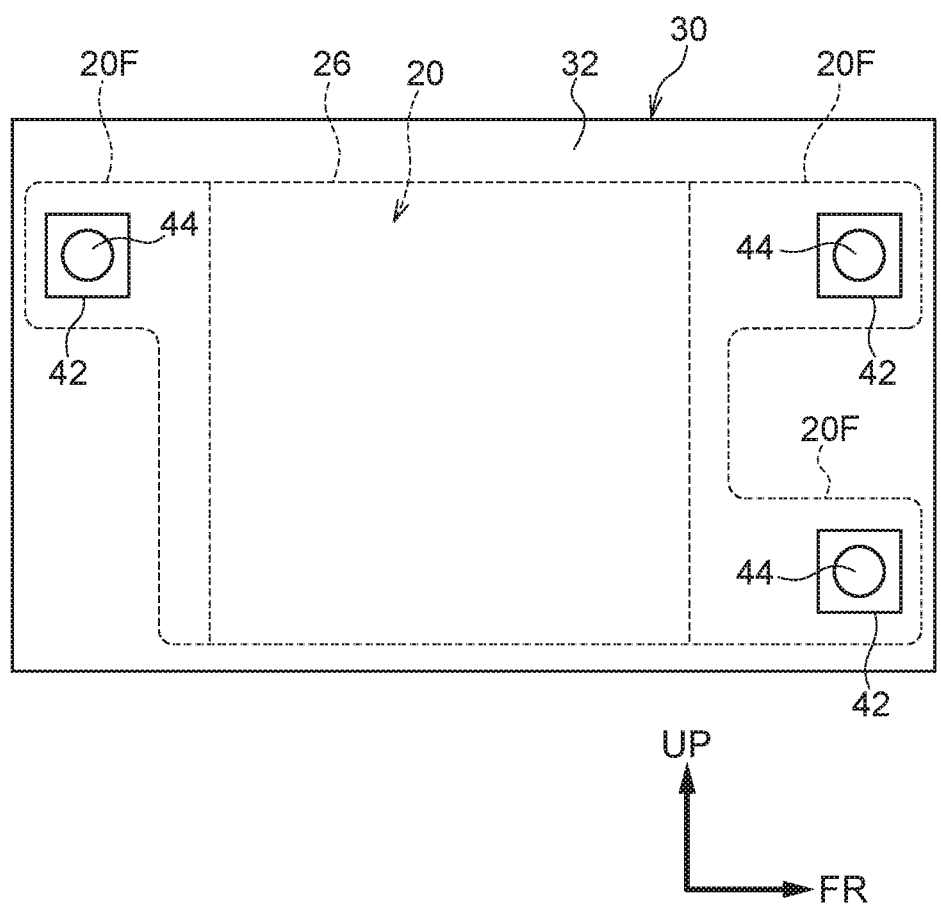

SENSOR MOUNTING STRUCTURE FOR VEHICLE

CROSS-REFERENCE TO RELATED APPLICATION

This application claims priority under 35 USC 119 from Japanese Patent Application No. 2018-217713 filed Nov. 20, 2018, the disclosure of which is incorporated by reference herein in its entirety.

BACKGROUND

Technical Field

The present disclosure relates to a sensor mounting structure for a vehicle.

Related Art

Vehicles having a device for detecting information at the periphery of the own vehicle are known (see, for example, Japanese Patent Application Laid-Open (JP-A) No. 2017-193223 and JP-A No. 2018-134936). For example, JP-A No. 2017-193223 discloses a structure in which peripheral information detection sensors are disposed at inner sides of fender panels at a vehicle front portion. To briefly describe this structure, the peripheral information detection sensors have detection portions, which detect peripheral information regarding the vehicle, and are disposed such that the detection portions face toward vehicle outer sides.

SUMMARY

In the above-described techniques, because the peripheral information detection sensors are disposed relatively close to a cowl, there is the concern that, depending on drainage paths of the cowl, the peripheral information detection sensors may be exposed to water due to drainage from the cowl.

In view of the above-described circumstances, the present disclosure provides a sensor mounting structure for a vehicle that can suppress a peripheral information detection sensor being exposed to water due to drainage from a cowl.

A sensor mounting structure for a vehicle of a first aspect of the present disclosure includes a fender panel structuring a side surface of a vehicle front portion; a cowl side panel configured to be provided at a lateral side of a cowl, and disposed at an inner side, in a vehicle transverse direction, of the fender panel so as to face a rear portion of the fender panel; a peripheral information detection sensor disposed at an inner side, in the vehicle transverse direction, of the rear portion of the fender panel and at an outer side, in the vehicle transverse direction, of the cowl side panel, the peripheral information detection sensor having a detection portion that detects peripheral information regarding the vehicle, and the detection portion facing toward an outer side in the vehicle transverse direction; and a mounting bracket having a vertical wall to which the peripheral information detection sensor is fixed, and the mounting bracket configured to be fixed to a vehicle body side member at the vehicle front portion, and being disposed between the peripheral information detection sensor and the cowl side panel.

Note that the fender panel is also included among examples of a "vehicle body side member at the vehicle front portion" to which the mounting bracket is fixed.

In accordance with the above-described structure, the peripheral information detection sensor is disposed at the inner side, in the vehicle transverse direction, of the rear portion of the fender panel, and at the outer side, in the vehicle transverse direction, of the cowl side panel. The detection portion, which detects peripheral information regarding the vehicle, of the peripheral information detection sensor faces toward the vehicle transverse direction outer side. Due thereto, other vehicles that are traveling at the lateral side of the vehicle, and obstacles, and the like can be detected by the peripheral information detection sensor. The peripheral information detection sensor is fixed to the mounting bracket that is fixed to a vehicle body side member at the vehicle front portion. The vertical wall of the mounting bracket is disposed between the peripheral information detection sensor and the cowl side panel. Accordingly, exposure to water at the back surface side of the peripheral information detection sensor due to drainage from the cowl can be suppressed by the vertical wall of the mounting bracket.

In a sensor mounting structure for a vehicle of a second aspect of the present disclosure, in the structure of the first aspect, the mounting bracket has an upper wall that extends from an upper end of the vertical wall toward an outer side in the vehicle transverse direction, and the upper wall covers at least a portion of a top surface side of the peripheral information detection sensor, and the upper wall is inclined toward a vehicle upper side on progression toward the vehicle transverse direction outer side from the upper end of the vertical wall.

In accordance with the above-described structure, the upper wall of the mounting bracket extends toward the vehicle transverse direction outer side from the upper end of the vertical wall, and covers at least a portion of the top surface side of the peripheral information detection sensor. Therefore, exposure to water at the top surface side of the peripheral information detection sensor due to drainage from the cowl can be suppressed by the upper wall of the mounting bracket. Further, the upper wall is inclined toward the vehicle upper side on progression toward the vehicle transverse direction outer side. Therefore, even if drainage from the cowl lands on the top surface of the upper wall, the water on the top surface of the upper wall flows along the top surface toward the vehicle transverse direction inner side. Accordingly, water accumulating on the top surface of the upper wall is suppressed, and, in addition, the detection portion of the peripheral information detection sensor can be suppressed being exposed to water.

In a sensor mounting structure for a vehicle of a third aspect of the present disclosure, in the structure of the second aspect, a rib, which projects out toward a vehicle upper side and extends in a vehicle longitudinal direction, is formed at a vehicle transverse direction outer side region of the upper wall of the mounting bracket.

In accordance with the above-described structure, even if drainage from the cowl lands on the top surface of the upper wall, that water can be suppressed more effectively from flowing toward the detection portion side of the peripheral information detection sensor by the rib.

As described above, in accordance with the sensor mounting structure for a vehicle of the present disclosure, there is the excellent effect that exposure to water at the peripheral information detection sensor due to drainage from the cowl can be suppressed.

BRIEF DESCRIPTION OF THE DRAWINGS

FIG. 3 is a perspective view showing the peripheral information detection sensor and a mounting bracket and the like of FIG. 1, in a simplified manner and in a state in which these are seen obliquely from a vehicle rear side and vehicle transverse direction outer side, and from a vehicle obliquely upper side;

FIG. 4 is a drawing showing the peripheral information detection sensor and the mounting bracket and the like of FIG. 1, in a simplified manner and in a state in which these are seen from a vehicle rear side; and FIG. 5 is a drawing showing a vertical wall portion of the mounting bracket of FIG. 4, in a simplified manner and in a state of being seen from the direction of arrow 5.

DETAILED DESCRIPTION

A sensor mounting structure for a vehicle relating to an embodiment of the present disclosure is described by using FIG. 1 through FIG. 5. Note that arrow FR that is shown appropriately in the respective drawings indicates the vehicle front side, arrow UP indicates the vehicle upper side, and arrow IN indicates the vehicle transverse direction inner side.

Structure of Embodiment

Figure 1:
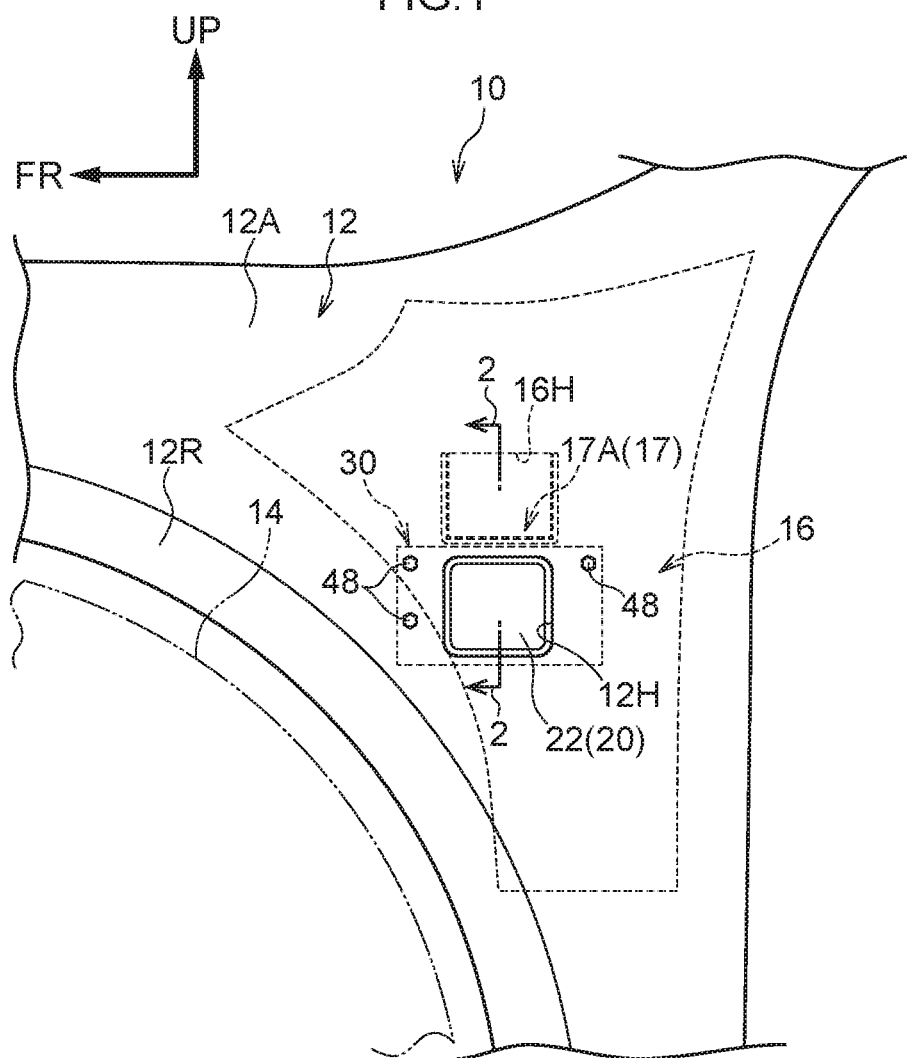
FIG. 1 is a side view showing a sensor mounting structure for a vehicle relating to an embodiment of the present disclosure, in a simplified manner and in a state in which the sensor mounting structure is seen from a vehicle transverse direction outer side.

A sensor mounting structure for a vehicle relating to the present embodiment is shown in FIG. 1 in a simplified side view and in a state of being seen from a vehicle transverse direction outer side. Fender panel (also called "front panel") 12 is disposed at a vehicle front side of an unillustrated front side door. The fender panel 12 has an outer side wall portion 12A that structures a side surface, i.e., a design surface, of a vehicle front portion 10. The outer side wall portion 12A is disposed at a vehicle upper side of a front wheel 14. A wheel arch portion 12R is formed at the outer side wall portion 12A along an upper side of an outer periphery of the front wheel 14. Further, an opening portion 12H, which is for a portion of a peripheral information detection sensor 20 to face toward a lateral side of the vehicle, is formed so as to pass-through a rear portion in the vehicle longitudinal direction of the outer side wall portion 12A. The fender panel 12 has an inner side wall portion (not illustrated) that hangs-down from the upper end portion of the outer side wall portion 12A and whose lower end side is bent horizontally toward a vehicle transverse direction inner side. The lower end portion of this inner side wall portion is mounted to an apron upper member (not illustrated), which is a vehicle body frame member, via an impact absorbing bracket (not illustrated).

Figure 2:
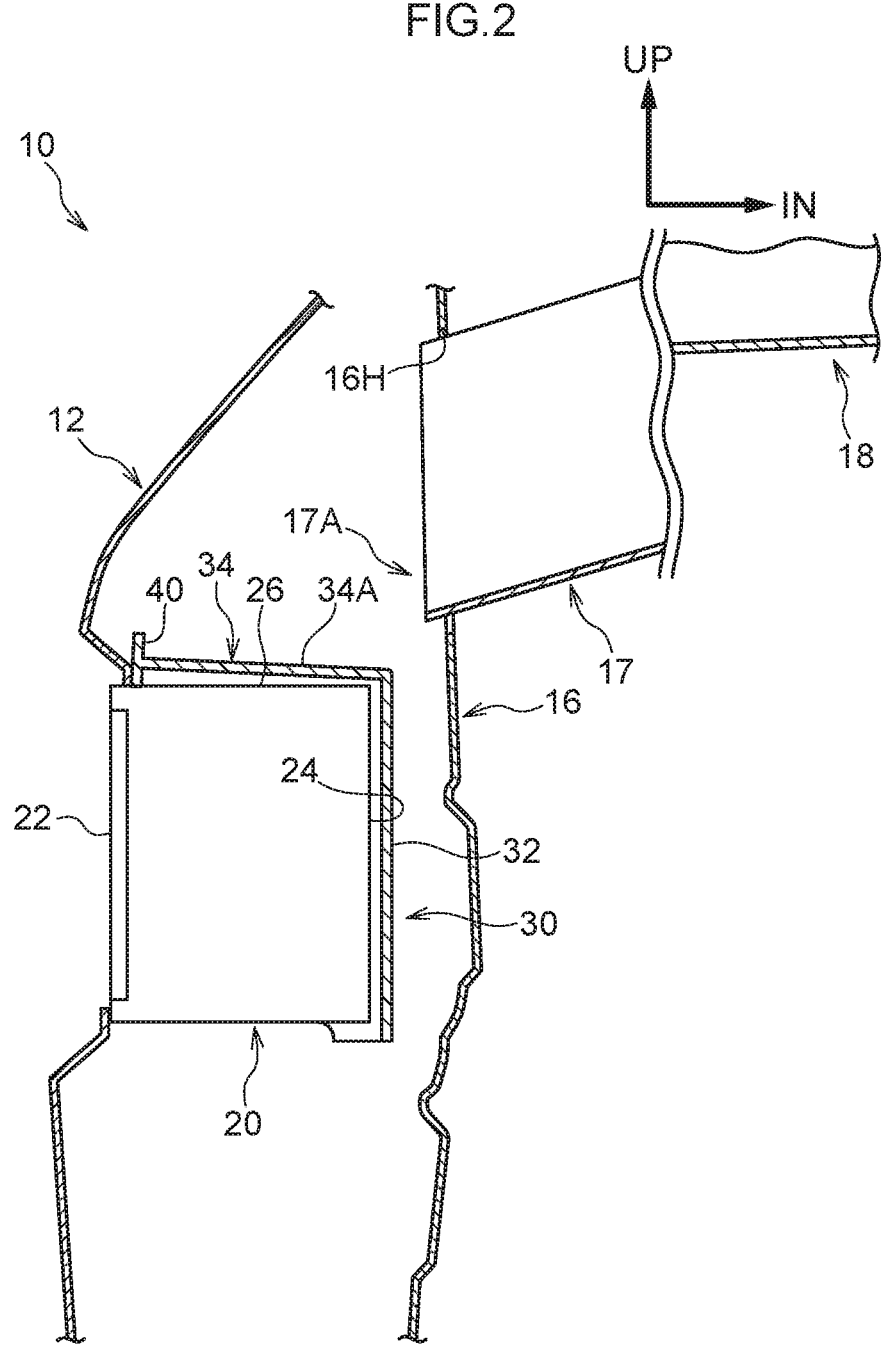
FIG. 2 is a longitudinal sectional view showing, in an enlarged manner and in a simplified manner, the state cut along line 2-2 of FIG. 1.

As shown in FIG. 2, a cowl side panel 16 is disposed so as to face the rear portion of the fender panel 12 at a vehicle transverse direction inner side of the fender panel 12. The cowl side panel 16 is provided at the lateral side of a cowl 18. Note that, in FIG. 2, a portion of the cowl 18 is shown at a right side of two omission wavy lines that are shown in the right side of the drawing. A portion of the cowl side panel 16 and the peripheral structure thereof are shown in FIG. 3 in a simplified perspective view and in a state of being seen obliquely from the vehicle rear side and vehicle transverse direction outer side, and from a vehicle obliquely upper side.

As shown in FIG. 3, the cowl side panel 16 is a panel member that is shaped as a vertical wall and that extends along the vehicle vertical direction and extends along the vehicle longitudinal direction.

An opening portion 16H (see FIG. 1) is formed so as to pass-through an upper portion side of the cowl side panel 16. A member 17 for drainage is disposed in the opening portion 16H of the cowl side panel 16. This member 17 is joined to the cowl side panel 16. The member 17 is a member for causing drainage from the cowl 18 (see FIG. 2) to flow toward the vehicle transverse direction outer side of the cowl side panel 16. As seen in a vehicle side view, the member 17 for drainage is formed in a substantial U-shape whose vehicle upper side is open, and the member 17 for drainage is inclined toward the vehicle lower side on progression toward the vehicle transverse direction outer side. Namely, a drainage portion 17A is formed at the upper portion side of the cowl side panel 16 by the opening portion 16H and the member 17 for drainage. The cowl 18 that is shown in FIG. 2 is formed to include a structural portion that is disposed at a lower side of the front windshield glass (not illustrated), and extends along the vehicle transverse direction, and is formed in a substantial U-shape whose vehicle upper side is open as seen in a vehicle side view. The cowl side panel 16 is disposed in a vicinity of an outer side end portion in the vehicle transverse direction of the cowl 18. The rear end portion of the cowl side panel 16 is joined to a front pillar (not illustrated). Note that the front pillar is a vehicle body frame member that is disposed along the vehicle vertical direction at an outer side end portion in the vehicle transverse direction of the vehicle cabin front portion, and that forms a front edge portion of a front side door opening portion.

As shown in FIG. 1 and FIG. 2, the peripheral information detection sensor (also called "periphery monitoring sensor") 20 is disposed at an inner side in the vehicle transverse direction of the rear portion of the fender panel 12 and at an outer side in the vehicle transverse direction of the cowl side panel 16. The peripheral information detection sensor 20 is formed in a substantially rectangular parallelepiped shape, and has a detection portion 22 that detects peripheral information regarding the vehicle. The detection portion 22 is disposed so as to face toward a vehicle transverse direction outer side. Further, in the present embodiment, as an example, LIDAR (Light Detection and Ranging/Laser Imaging Detection and Ranging) is used as the peripheral information detection sensor 20. The detection portion 22 includes a light projecting portion, which emits light in the form of pulses and irradiates laser light, and a light receiving portion which receives scattered light that has been reflected by objects onto which the laser light has been illuminated. The light receiving portion can be considered to be an "optical surface".

Note that the present disclosure is not limited to the above-described structure, and another sensor such as a millimeter wave radar, an ultrasonic sensor, an optical camera or the like can be used as the peripheral information detection sensor 20. For example, in a case in which a millimeter wave radar is used as the peripheral information detection sensor 20, the detection portion includes a radio wave transmitting portion and receiving portion. Further, in a case in which an ultrasonic sensor is used as the peripheral information detection sensor 20, the detection portion includes a transmitter and a receiver. Moreover, in a case in which an optical camera is used as the peripheral information detection sensor 20, the detection portion includes a light-receiving portion of visible light.

The peripheral information detection sensor 20 is mounted to the fender panel 12 via a mounting bracket 30 that is shown in FIG. 2. As will be described later, the mounting bracket 30 is structured to include a shaped portion for protecting the peripheral information detection sensor 20 from being exposed to water. The mounting bracket 30 has a vertical wall 32 that is disposed between the peripheral information detection sensor 20 and the cowl side panel 16. The vertical wall 32 covers a back surface 24 side (i.e., the side opposite the side of the detection portion 22) of the peripheral information detection sensor 20, over the entire region thereof.

As shown in FIG. 5, the vertical wall 32 is shaped as a rectangular plate that is long in the vehicle longitudinal direction, and the peripheral information detection sensor 20 is disposed at the vehicle transverse direction outer side of the vertical wall 32. As an example, the peripheral information detection sensor 20 has flange portions 20F at an upper portion and a lower portion at a front side thereof in the vehicle longitudinal direction, and at an upper portion at a rear side thereof in the vehicle longitudinal direction. A fastening hole (not illustrated) that passes-through in the vehicle transverse direction is formed in each of the flange portions 20F. Further, nuts 42 are embedded in the vertical wall 32 at two places that are at an upper portion and a lower portion at front side thereof in the vehicle longitudinal direction, and at one place that is at an upper portion at a rear side thereof in the vehicle longitudinal direction, so as to correspond to the aforementioned fastening holes of the flange portions 20F. The peripheral information detection sensor 20 is fixed to the vertical wall 32 of the mounting bracket 30 due to bolts 44, which are passed-through the aforementioned fastening holes of the flange portions 20F from the vehicle transverse direction outer side, being screwed-together with the nuts 42.

As shown in FIG. 2 and FIG. 3, the mounting bracket 30 has an upper wall 34 that extends from an upper end of the vertical wall 32 toward a vehicle transverse direction outer side and that covers the majority of a top surface 26 side of the peripheral information detection sensor 20. To describe this further, the upper wall 34 covers, of the top surface 26 of the peripheral information detection sensor 20, the portion thereof other than a vehicle transverse direction outer side end portion. The upper wall 34 is inclined toward the vehicle upper side on progression toward the vehicle transverse direction outer side. Further, as shown in FIG. 3, a rib 40, which projects out toward a vehicle upper side and extends in the vehicle longitudinal direction, is formed at an outer side end in the vehicle transverse direction of the upper wall 34 of the mounting bracket 30.

The mounting bracket 30 has side walls 36 that extend toward the vehicle lower side from the vehicle longitudinal direction both ends of the upper wall 34 and that cover the majority of side surfaces 28 of the peripheral information detection sensor 20. Note that, of the pair of side walls 36, the side wall 36 that is at the vehicle front side is not illustrated in FIG. 3 and FIG. 4. However, the shape, as seen from the vehicle rear side, of the side wall 36 at the vehicle front side is similar to that of the side wall 36 at the vehicle rear side. Further, as shown in FIG. 3, the mounting bracket 30 has an outer side wall 38 that structures a vehicle transverse direction outer side end portion of the mounting bracket 30 and that is positioned at a vehicle lower side of the rib 40. The shape, as seen from the vehicle transverse direction outer side, of the outer side wall portion 38 is an upside-down U-shape. Nuts 46 whose axial directions are along the vehicle transverse direction are partially embedded in and fixed to the outer side wall 38, at two places at an upper portion and a lower portion at the vehicle longitudinal direction front side thereof, and at one place at an upper portion at the vehicle longitudinal direction rear side thereof. The mounting bracket 30 that is shown in FIG. 3 is fixed to the fender panel 12 of the vehicle front portion 10 shown in FIG. 1, due to bolts 48, which are passed-through the fender panel 12 from the vehicle transverse direction outer side, being screwed-together with the nuts 46 (see FIG. 3).

Operation/Effects of Present Embodiment

Operation and effects of the above-described embodiment are described next.

In the present embodiment, the peripheral information detection sensor 20 is disposed at the vehicle transverse direction inner side of the rear portion of the fender panel 12 shown in FIG. 2, and at the vehicle transverse direction outer side of the cowl side panel 16. The detection portion 22, which detects peripheral information regarding the vehicle, faces toward the vehicle transverse direction outer side. Due thereto, other vehicles that are traveling at the lateral side of the vehicle, and obstacles, and the like can be detected by the peripheral information detection sensor 20.

Further, in the present embodiment, the peripheral information detection sensor 20 is fixed to the mounting bracket 30 that is fixed to the fender panel 12, and the vertical wall 32 of the mounting bracket 30 is disposed between the peripheral information detection sensor 20 and the cowl side panel 16. Accordingly, even if drainage water is fallen-down from the cowl 18 via the member 17 for drainage from the drainage portion 17A when it rains or when the vehicle is washed or the like, exposure to the drainage water at the back surface 24 side of the peripheral information detection sensor 20 can be suppressed or prevented by the vertical wall 32 of the mounting bracket 30. In other words, the environment-resistance, with respect to water, of the back surface 24 of the peripheral information detection sensor 20 is improved.

Further, in the present embodiment, the upper wall 34 of the mounting bracket 30 covers the majority of the top surface 26 side of the peripheral information detection sensor 20. Exposure to the drainage water at the top surface 26 side of the peripheral information detection sensor 20 can be suppressed or prevented by the upper wall 34 of the mounting bracket 30. In further detail, in the present embodiment, entry of water into the interior of the peripheral information detection sensor 20 can be suppressed by the vertical wall 32 and the upper wall 34 of the mounting bracket 30, and trouble with the peripheral information detection sensor 20 that is caused by entry of water can be prevented or effectively suppressed.

Further, the upper wall 34 is inclined toward the vehicle upper side on progression toward the vehicle transverse direction outer side. Even if the drainage water lands on the top surface 34A of the upper wall 34, the water flows along the top surface 34A of the upper wall portion 34 toward the vehicle transverse direction inner side. Accordingly, water, and, depending on the case, snow, accumulating on the top surface 34A of the upper wall 34 is suppressed, and, in addition, the detection portion 22, which faces toward the vehicle transverse direction outer side, can be prevented from being exposed to water.

Further, in the present embodiment, the rib 40, which projects-out toward the vehicle upper side and extends in the vehicle longitudinal direction, is formed at the vehicle transverse direction outer side region of the upper wall 34 of the mounting bracket 30. Even if the drainage water lands on the top surface 34A of the upper wall 34, that water flowing to the detection portion 22 side can be suppressed more effectively by the rib 40 at the peripheral information detection sensor 20. As a result, the recognition performance of the detection portion 22 can be prevented from being deteriorated due to exposure to water.

As described above, in accordance with the sensor mounting structure for a vehicle of the present embodiment, the peripheral information detection sensor 20 can be prevented from being exposed to water due to drainage from the cowl 18. The peripheral information detection sensor 20 can be prevented from being disturbed by drainage from the cowl 18 or substances accompanying the drainage.

Supplemental Description of Embodiment

Note that, in the above-described embodiment, the mounting bracket 30 is fixed to the fender panel 12. However, as a modified example of the above-described embodiment, the mounting bracket may be fixed to a vehicle body side member other than the fender panel (12) such as, for example, the apron upper member or the like.

Further, in the above-described embodiment, the vertical wall 32 of the mounting bracket 30 covers the back surface 24 side of the peripheral information detection sensor 20 over the entire region thereof. However, as a modified example of the above-described embodiment, a structure can be employed in which the vertical wall portion of the mounting bracket covers only the upper portion of the back surface (24) side of the peripheral information detection sensor (20).

Further, in the above-described embodiment, the upper wall portion 34 of the mounting bracket 30 covers the majority of the top surface 26 side of the peripheral information detection sensor 20. However, as a modified example of the above-described embodiment, the upper wall portion of the mounting bracket may be an upper wall portion that covers the entire top surface (26) side of the peripheral information detection sensor (20), or may be an upper wall portion that covers a portion that cannot necessarily be called the majority of the top surface (26) side of the peripheral information detection sensor (20).

Further, as a modified example of the above-described embodiment, instead of the upper wall portion 34 at the mounting bracket 30, a structure can be employed in which the mounting bracket has a wall portion that extends from the upper end of the vertical wall portion (32) toward the vehicle transverse direction outer side in the vehicle horizontal direction and covers at least a portion of the top surface side of the peripheral information detection sensor (20). Further, as another modified example, a structure that does not have a wall portion that corresponds to the upper wall portion 34 of the mounting bracket 30 can be employed.

Further, although the rib 40 is formed at the vehicle transverse direction outer side region of the upper wall portion 34 of the mounting bracket 30, a structure at which such a rib is not formed can be employed.

Further, in the above-described embodiment, the side wall portions 36 of the mounting bracket 30 shown in FIG. 3 cover the majority of the side surface 28 sides of the peripheral information detection sensor 20. However, as modified examples of the above-described embodiment, the side walls of the mounting bracket may cover the entire side surface (28) sides of the peripheral information detection sensor (20), or may cover portions of the side surface (28) sides of the peripheral information detection sensor (20). Further, as another modified example, a structure in which walls corresponding to the side wall 36 of the mounting bracket 30 are not provided can be employed.

Note that the above-described embodiment and above-described modified examples can be implemented by being combined together appropriately.

Although examples of the present disclosure have been described above, the present disclosure is not limited to the above, and, of course, can be implemented by being modified in various ways other than the above within a range that does not depart from the scope thereof.

What is claimed is:

1. A sensor mounting structure for a vehicle, comprising:
    a fender panel structuring a side surface of a vehicle front portion;
    a cowl side panel configured to be provided at a lateral side of a cowl, and disposed at an inner side, in a vehicle transverse direction, of the fender panel so as to face a rear portion of the fender panel;
    a peripheral information detection sensor disposed at an inner side, in the vehicle transverse direction, of the rear portion of the fender panel and at an outer side, in the vehicle transverse direction, of the cowl side panel, the peripheral information detection sensor having a detection portion that detects peripheral information regarding the vehicle, and the detection portion facing toward an outer side in the vehicle transverse direction; and
    a mounting bracket having a vertical wall to which the peripheral information detection sensor is fixed, the mounting bracket configured to be fixed to the fender panel or another vehicle body side member at the vehicle front portion and being disposed between the peripheral information detection sensor and the cowl side panel.

2. The sensor mounting structure for a vehicle of claim 1, wherein:
    the mounting bracket has an upper wall that extends from an upper end of the vertical wall toward an outer side in the vehicle transverse direction, and the upper wall covers at least a portion of a top surface side of the peripheral information detection sensor, and
    the upper wall is inclined toward a vehicle upper side on progression toward the vehicle transverse direction outer side from the upper end of the vertical wall.

3. The sensor mounting structure for a vehicle of claim 2, wherein a rib, which projects out toward a vehicle upper side and extends in a vehicle longitudinal direction, is formed at a vehicle transverse direction outer side region of the upper wall of the mounting bracket.

* * * * *